Feb. 8, 1944.    S. M. TUCKER ET AL    2,341,491
FILM SPOOL
Filed April 28, 1942
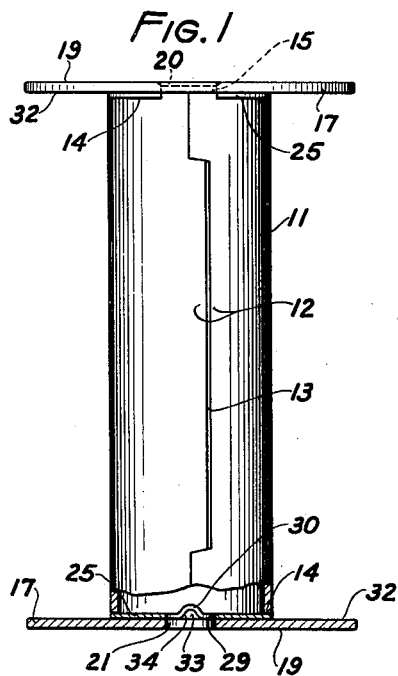
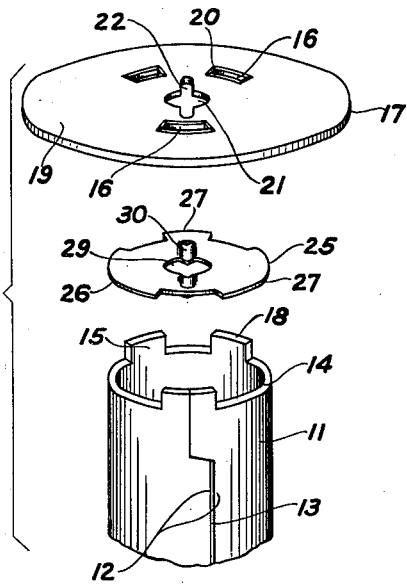
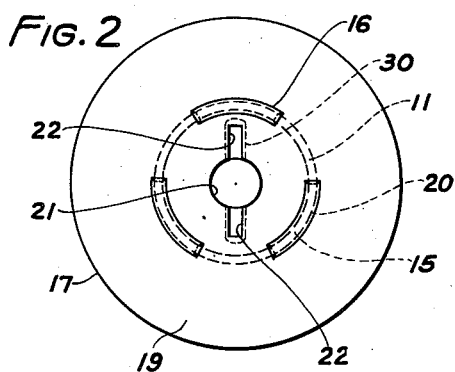
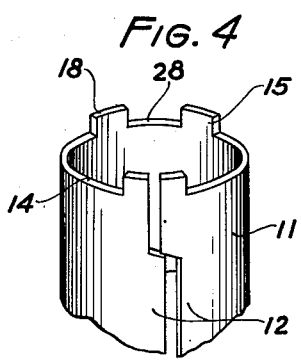
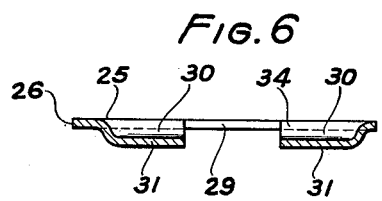
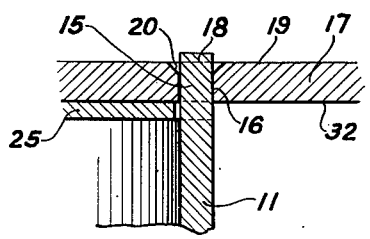
STEPHEN M. TUCKER
WILLIAM N. SCHULER
INVENTOR
BY Newton M. Perrine
J. Griffin Little
ATTORNEYS Patented Feb. 8, 1944

2,341,491

UNITED STATES PATENT OFFICE 2,341,491

FILM SPOOL

Stephen M. Tucker and William N. Schuler, Rochester, N. Y., assignors to Eastman Kodak Company, Rochester, N. Y., a corporation of New Jersey Application April 28, 1942, Serial No. 440,814

1 Claim. (Cl. 242—70)

The present invention relates to photography, and more particularly to film spools for use in photographic cameras or projectors.

One object of the invention is the provision of a novel arrangement for retaining the spool parts in correct assembled relation.

A further object of the invention is the provision of an insert positioned between an end of the spool hub or core and the adjacent end flange to afford key engaging portions by which the spool may be rotated.

To these and other ends, the invention resides in certain improvements and combinations of parts, all as will be hereinafter more fully described, the novel features being pointed out in the claim at the end of the specification.

In the drawing:

Fig. 1 is a view of a film spool, with parts in section, constructed in accordance with the preferred embodiment of the present invention;

Fig. 2 is an end view of the spool shown in Fig. 1 showing the tongues by which the spool hub or core and the end flanges are retained in assembled relation;

Fig. 3 is a partial extended or exploded view of the parts forming one end of the spool of the present invention;

Fig. 4 is a perspective view of one end of the film spool core showing the arrangement of the tongues for securing an end flange to the core and for retaining the insert plate in position;

Fig. 5 is a sectional view through one of the connecting tongues and an end flange, showing the countersunk opening in the end flange into which the end of the tongue may be spread to secure the flange to the tongue and hence to the spool core; and Fig. 6 is a sectional view through the insert plate showing the means for limiting the inward movement of the driving key and the key engaging portion by which the spool may be rotated.

Similar reference numerals throughout the various views indicate the same parts.

The present invention is embodied, in the present instance, in a film spool primarily designed for use in a photographic camera, projector, or viewer. It is contemplated, however, that such a spool construction is suitable for use in any device on which a strip of sheet material is to be wound up, as will be readily apparent. The term "film" is, therefore, used in a generic sense to include any material in a strip or web form adapted to be wound up on a spool.

The present spool comprises, in general, a core or hub 11 made from a flat strip of sheet material which is rolled or formed up to provide a hollow cylindrical or tubular member, as shown in Figs. 1, 3, and 4. The strip is so cut that when formed up into a cylinder, the ends 12 are slightly spaced to provide a slot 13 for the reception of the end of the film strip, in a manner well known in the art. The side edges 14 of the core forming strip are provided with a plurality, in the present instance three, axially extending lugs or tongues 15. The latter are adapted to extend through similarly shaped and registering slots 16 formed in the end flanges 17 to position the latter on the ends of the core 11, as shown in Fig. 1. The free ends 18 of the tongues 15 may be bent or riveted over to permanently secure the flanges 17 to the core 11, in a manner well known in the art. It is preferred, however, to have the bent or riveted-over ends 18 of the tongues 15 positioned in the plane of or slightly below the outer face 19 of the end flange. To this end, the ends of the slot 16, adjacent the outer flange face 19 are countersunk, as shown at 20, so that when the ends 18 of the tongues 15 are riveted over they will lie preferably slightly below the face 19 to provide a smooth surface free from projections, the advantages of which will be readily apparent to those in the art.

One of the end flanges 17 is provided with a central opening 21 and lateral openings or slots 22 extending from the central opening 21, as clearly shown in Figs. 2 and 3. If desired, the slots 22 may be milled out of the flange 17 to a depth less than the thickness of the flange to provide sections adapted to receive a winding key by which the spool may be rotated. Such an arrangement would, however, require an end flange of an excessive thickness, the disadvantages of which will be readily apparent to those in the art. The present invention, however, provides an arrangement by which relatively thin end flanges may be used, yet providing a sufficient and ample bearing or driving portion for a winding key.

To secure this result, a flat disk or plate 25 is inserted or positioned between the end of the core 11 and the adjacent end flange 17, as clearly shown in Fig. 1. This plate 25 thus cooperates with the thin end flange 17 to provide the desired thickness, as will be later described. The peripheral edge 26 of the plate 25 is provided with a plurality, in the present instance three, spaced radially extending lugs 27. The diameter of the plate 25 is substantially equal to the internal diameter of the core 11 so that the lugs 27 will project into the spaces 28 between the tongues 15, as will be apparent from an inspection of Fig. 3. The lugs 27 and tongues 15 thus cooperate to operatively connect the core and disk so that these members will rotate as a unit. The plate 25 may, therefore, be considered broadly as part of the core 11.

The plate 25 is preferably formed with a spindle opening 29 arranged in alignment with the opening 20 of the end flange 17 to permit the passing of a key carrying shaft, not shown, therethrough. A pair of aligned inwardly dished or embossed sections 30 project radially from the opening 29. The bottoms 31 of the sections 30 are spaced from the inner face 32 of the end flange 17 to provide a space 33 for the reception of a winding key, as will be apparent from an inspection of Figs. 1 and 6. The sections 30 are arranged in registry with the slots or openings 22 in the end flange 17 so that the winding key may pass through the flange openings 22 and into the space 33, the bottoms 31 limiting the inward movement of the key to properly position the latter in the embossed sections 30. Upon rotation of the key, the latter engages the sides 34 of the sections 30 to rotate the plate 25 and hence the entire spool.

By means of the insert plate 25, the end flanges may be made relatively thin, yet providing adequate bearings for the winding key. Such an arrangement also materially reduces the cost of manufacturing such spools.

While one embodiment of the invention has been disclosed, it is to be understood that the inventive idea may be carried out in a number of ways. This application is, therefore, not to be limited to the precise details described, but is intended to cover all variations and modifications thereof falling within the scope of the appended claim.

We claim:

In a film spool, the combination with a tubular hub formed with a plurality of axially extending tongues projecting from the ends of said hub, a pair of end flanges positioned at the ends of said hub and formed with slots through which said tongues may extend to connect said flanges to the ends of said hub, of a circular insert plate having a diameter substantially equal to the internal diameter of said hub arranged between an end of said hub and an adjacent end flange, an embossed area formed on said plate and projecting out of the plane thereof to provide a winding key receiving section spaced from said adjacent end flange, said adjacent flange being formed with an opening registering with and corresponding in size to said area to permit the passage of said key through said flange and into said area, a bottom on said area positioned in the path of said key to limit the inward movement thereof and to position said key in said area, side portions on said area engageable by said key to rotate said plate, and radially extending lugs on said plate extending into the spaces between said tongues and resting on the end of said hub to support said plate on the end of said hub and providing the sole means for operatively connecting the latter to said plate so that the rotation of the latter by said key will also serve to rotate said spool.

STEPHEN M. TUCKER.
WILLIAM N. SCHULER.